(12) United States Patent
Allred

(10) Patent No.: US 7,222,957 B1
(45) Date of Patent: May 29, 2007

(54) EYEGLASSES ASSEMBLY

(76) Inventor: Robert W. Allred, P.O. Box 668212, Charlotte, NC (US) 28266

( * ) Notice: Subject to any disclaimer, the term of this patent is extended or adjusted under 35 U.S.C. 154(b) by 0 days.

(21) Appl. No.: 11/329,836

(22) Filed: Jan. 12, 2006

(51) Int. Cl.
*G02C 7/06* (2006.01)
(52) U.S. Cl. ....................................................... 351/54
(58) Field of Classification Search ................. 351/41, 351/54, 111
See application file for complete search history.

(56) References Cited

U.S. PATENT DOCUMENTS

| | | | |
|---|---|---|---|
| 1,381,603 A * | 6/1921 | Updegrave et al. ............ 351/54 |
| 2,285,615 A * | 6/1942 | Ruchser ........................ 351/54 |
| 3,476,466 A | 11/1969 | Hopkins |
| 4,367,929 A | 1/1983 | Fortini |
| 4,547,048 A | 10/1985 | Negishi |
| D448,792 S | 10/2001 | Miceli |
| 6,530,660 B1 | 3/2003 | Chao et al. |
| 6,719,425 B2 | 4/2004 | Conner |
| 2004/0130674 A1* | 7/2004 | Epstein ........................ 351/115 |

* cited by examiner

*Primary Examiner*—Huy Mai

(57) ABSTRACT

An eyeglasses assembly includes a pair of bifocals. Each of the bifocals includes a regular lens portion and a magnifying lens portion. A bridge is attached to the bifocals. The bifocals lie in a same plane as each other and the magnifying lens portions is aligned with each other. Each of a pair of temples has a first end and a second end. Each of the first ends is coupled to one of the bifocals. Each of the temples has a break therein to define a first portion and a second portion of each of the temples. A pair of couplers is provided. Each of the couplers rotatably couples one of the first portions to a corresponding one of the second portions. The first and second portions are rotatable with respect to each other along a common longitudinal axis.

2 Claims, 3 Drawing Sheets

EYEGLASSES ASSEMBLY

BACKGROUND OF THE INVENTION

1. Field of the Invention

The present invention relates to eyeglasses and more particularly pertains to new eyeglasses for that allows a person to selective rotate the lenses with respect to the temples to allow the magnifying portion of bifocals to be positioned in either an upper position or a lower position with respect to the eyes of a wearer of the eyeglasses.

2. Description of the Prior Art

The use of eyeglasses is known in the prior art. While these devices fulfill their respective, particular objectives and requirements, the need remains for eyeglasses that allow a person to selectively switch the magnifying portion of bifocals to either an upper or lower position. This will provide the wearer with the option of looking either downwardly through or forward through the magnifying portions.

SUMMARY OF THE INVENTION

The present invention meets the needs presented above by generally comprising a pair of bifocals. Each of the bifocals includes a regular lens portion and a magnifying lens portion. A bridge is attached to and extends between the bifocals. The bifocals lie in a same plane as each other and the magnifying lens portions is aligned with each other. Each of a pair of temples has a first end and a second end. Each of the first ends is coupled to one of the bifocals. The bifocals are positioned between the first ends. Each of the temples has a break therein to define a first portion and a second portion of each of the temples. Each of a pair of end pieces is attached to one of the second ends. A pair of couplers is provided. Each of the couplers rotatably couples one of the first portions to a corresponding one of the second portions. The first and second portions are rotatable with respect to each other along a common longitudinal axis.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
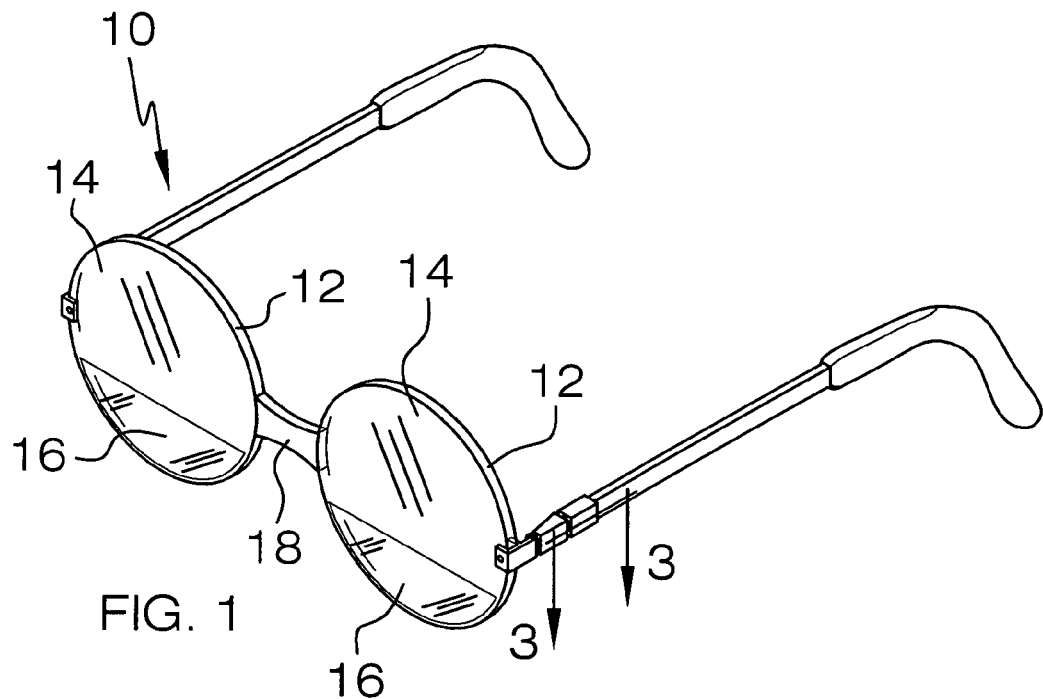
FIG. 1 is a perspective view of a eyeglasses assembly according to the present invention.
Figure 2:
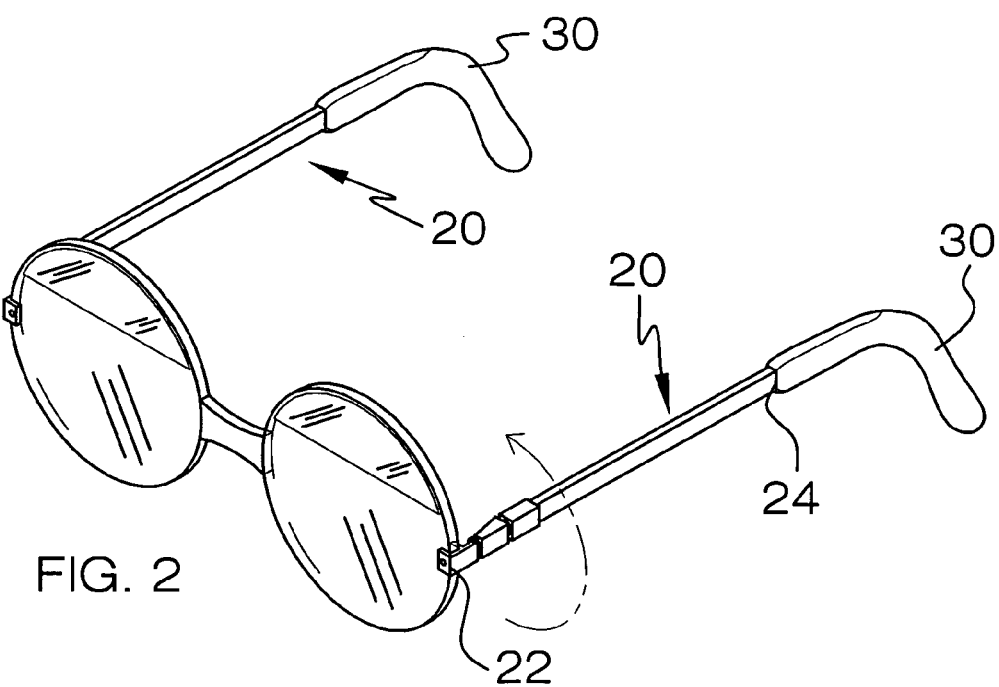
FIG. 2 is a perspective view of the present invention.
Figure 3:
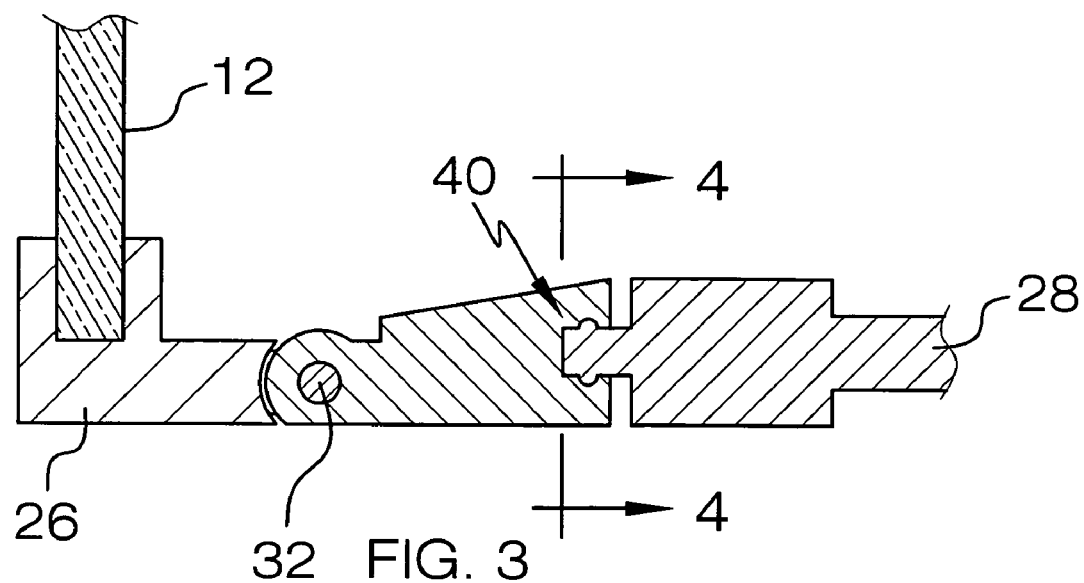
FIG. 3 is a cross-sectional view taken along line 3—3 of FIG. 1 of the present invention.
Figure 4:
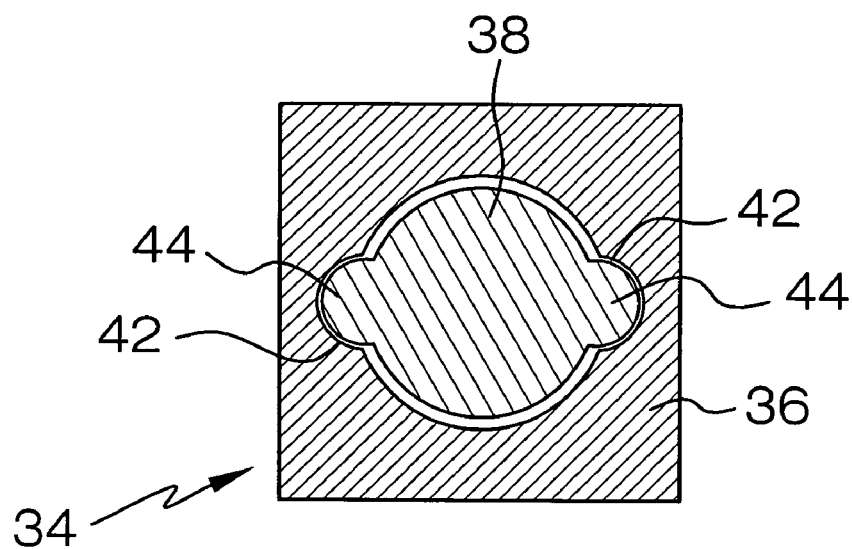
FIG. 4 is a cross-sectional view taken along line 4—4 of FIG. 3 of the present invention.
Figure 5:
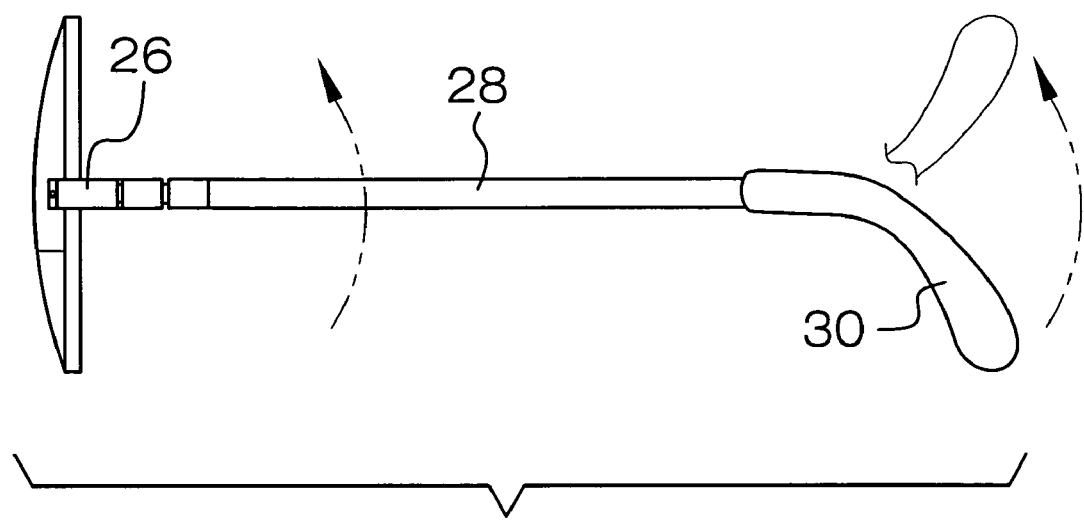
FIG. 5 is a side view of the present invention.

With reference now to the drawings, and in particular to FIGS. 1 through 5 thereof, a new eyeglasses embodying the principles and concepts of the present invention and generally designated by the reference numeral 10 will be described.

As best illustrated in FIGS. 1 through 5, the eyeglasses assembly 10 generally comprises a pair of bifocals 12. Each of the bifocals 12 includes a regular lens portion 14 and a magnifying lens portion 16. A bridge 18 is attached to and extends between the bifocals 12. The bifocals 12 lie in a same plane as each other and the magnifying lens portions 16 are aligned with each other.

A pair of temples 20 is provided and each of the temples 20 has a first end 22 and a second end 24. Each of the first ends 22 is coupled to one of the bifocals 12. Each of the bifocals 12 is positioned between the first ends 22. Each of the temples 20 has a break therein to define a first portion 26 and a second portion 28 of each of the temples 20. Each of a pair of end pieces 30 is attached to one of the second ends 24. The first portions 26 preferably include hinges 32 for allowing the temples 20 to be collapsed against the bifocals 12.

Each of a pair of couplers 34 rotatably couples one of the first portions 26 to a corresponding one of the second portions 28. The first 26 and second 28 portions are rotatable with respect to each other along a common longitudinal axis. Each of the couplers 34 includes a first mating portion 36 attached to one of the first portions 34 and a second mating portion 38 attached to one of the second portions. The first mating portions 36 each comprise a female mating member and the second mating portions 38 each comprise a male mating member.

A pair of locking members 40 is provided. Each of the locking members 40 is configured to lock each of the first 26 and second 28 portions at 180 degree increments with respect to each other. Each of the locking members 40 includes oppositely positioned grooves 42 positioned within the female mating members, or first mating portions 36, and corresponding nubs attached to the male mating members, or the second mating portions 38.

In use, the eyeglasses assembly 10 is worn in a conventional manner so that a person may look through the bifocals 12. The wearer may selectively rotate the second portions 28 with respect to the first portion 26 to place the magnified portion 16 in either a lower position or an upper portion with respect to the wearer's eyes. The locking members 40 lock the end pieces in either a downward or an upward extending orientation with respect to the bifocals 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An eyeglasses assembly comprising:

a pair of bifocals, each of said bifocals including a regular lens portion and a magnifying lens portion;

a bridge being attached to and extending between said bifocals, said bifocals lying in a same plane as each other, said magnifying lens portions being aligned with each other;

a pair of temples, each of said temples having a first end and a second end, each of said first ends being coupled to one of said bifocals, each of said bifocals being positioned between said first ends, each of said temples having a break therein to define a first portion and a second portion of each of said temples;

a pair of end pieces, each of said end pieces being attached to one of said second ends;

a pair of couplers, each of said couplers rotatably coupling one of said first portions to a corresponding one of said second portions, said first and second portions being rotatable with respect to each other along a common longitudinal axis, each of said couplers including a first mating portion attached to one of said first portions and a second mating portion attached to one of said second portions, said first mating portions each comprising a female mating member and said second mating portions each comprising a male mating member; and a pair of locking members, each of said locking members being configured to lock each of said first and second portions at 180 degree increments with respect to each other, each of said locking members including oppositely positioned grooves positioned within said female mating members and corresponding nubs attached to said male mating members, said male mating member being elongated and having a cylindrical shape, said female mating member having a proximal end positioned adjacent to said second portion and having a cylindrical opening therein, said male mating member being positioned in said cylindrical opening, said grooves being spaced from said proximal end, said nubs being attached to and extending away from said male mating member and being positionable in said grooves.

2. The assembly according to claim 1, wherein a receiving space is defined between said male mating member and said female mating member along an outer surface of said male mating member extending between said nubs, said nubs being allowed to move along said receiving space when said nubs are moved from one of said grooves to the other of said grooves.

* * * * *